(12) United States Patent
Hudman (10) Patent No.: US 11,086,129 B2
(45) Date of Patent: Aug. 10, 2021

(54) HEAD-MOUNTED DISPLAY WITH NARROW ANGLE BACKLIGHT

(71) Applicant: Valve Corporation, Bellevue, WA (US)

(72) Inventor: Joshua Mark Hudman, Issaquah, WA (US)

(73) Assignee: Valve Corporation, Bellevue, WA (US)

( * ) Notice: Subject to any disclaimer, the term of this patent is extended or adjusted under 35 U.S.C. 154(b) by 240 days.

(21) Appl. No.: 16/273,054

(22) Filed: Feb. 11, 2019

(65) Prior Publication Data

US 2019/0258063 A1 Aug. 22, 2019

Related U.S. Application Data

(60) Provisional application No. 62/633,510, filed on Feb. 21, 2018.

(51) Int. Cl.
| | |
|---|---|
| *G02B 27/01* | (2006.01) |
| *G02F 1/13357* | (2006.01) |
| *G06F 3/01* | (2006.01) |
| *G02F 1/1335* | (2006.01) |
| *G06T 19/00* | (2011.01) |

(52) U.S. Cl.
CPC ....... *G02B 27/0172* (2013.01); *G02F 1/1336* (2013.01); *G02F 1/133526* (2013.01); *G06F 3/011* (2013.01); *G06T 19/006* (2013.01)

(58) Field of Classification Search
CPC .............. G02B 27/017; G02B 27/0172; G02B 2027/0178; G02B 2027/012; G02F 3/011; G02F 1/1336; G02F 1/133602; G02F 1/133603; G02F 1/133605; G06F 3/011

USPC ......................................................... 359/630
See application file for complete search history.

(56) References Cited

U.S. PATENT DOCUMENTS

| | | | | |
|---|---|---|---|---|
| 2001/0017674 | A1* | 8/2001 | Yamaguchi | ........... G02F 1/1336 349/61 |
| 2002/0191297 | A1* | 12/2002 | Gleckman | .......... G02B 27/0172 359/629 |
| 2004/0240777 | A1 | 12/2004 | Woodgate et al. | |
| 2013/0050834 | A1 | 2/2013 | Fujikawa | |

(Continued)

FOREIGN PATENT DOCUMENTS

WO 2016/084744 A1 2/2016

OTHER PUBLICATIONS

PCT Search Report and Written Opinion dated May 7, 2019 for PCT Application No. PCT/US19/18830, 9 pages.

*Primary Examiner* — Jordan M Schwartz
(74) *Attorney, Agent, or Firm* — Seed Intellectual Property Law Group LLP (57) ABSTRACT

Methods and systems relating generally to information displays, and more particularly to systems and methods for backlight assemblies for information displays that emit an angularly narrow cone of light. A backlight assembly that emits a narrow angular cone of light can be particularly beneficial in a head-mounted display configuration, such as for use as part of virtual reality or augmented reality systems, where the head-mounted display comprises a lens assembly that directs light from an information display to the eyes of the user. Such a backlight assembly configuration may help reduce undesirable visual effects like flood illumination, ghost images, glare, and scattering.

11 Claims, 9 Drawing Sheets

(56) References Cited

U.S. PATENT DOCUMENTS

| | | |
|---|---|---|
| 2017/0019602 A1 | 1/2017 | Dopilka et al. |
| 2017/0068100 A1* | 3/2017 | Ouderkirk ............ G02B 5/3058 |
| 2017/0357100 A1* | 12/2017 | Ouderkirk ................ F21V 5/02 |
| 2018/0321488 A1 | 11/2018 | Usukura et al. |
| 2019/0285902 A1* | 9/2019 | Ouderkirk .......... G02B 27/0955 |

* cited by examiner

Prior Art

HEAD-MOUNTED DISPLAY WITH NARROW ANGLE BACKLIGHT

CROSS REFERENCE TO RELATED APPLICATION

This application claims priority to commonly assigned, U.S. Provisional Patent Application Ser. No. 62/633,510, filed Feb. 21, 2018. Application Ser. No. 62/633,510 is fully incorporated herein by reference.

BACKGROUND OF THE DISCLOSURE

1. Field of the Disclosure

The disclosure relates generally to backlights for information displays, and more particularly to systems and methods for backlights that emit an angularly narrow cone of light for use in close-eye or head-mounted displays.

2. General Background

A backlit information display, such as a Liquid Crystal Display ("LCD"), comprises several components. Two of those components are the display matrix, which obstructs light on a highly granular sub-pixel basis to create a displayed image, and a light source or backlight. The light source is typically positioned behind the display matrix and illuminates the displayed image. For a color display, the backlight typically emits broad spectrum light, i.e. white light.

Traditionally, the light source used in backlit displays was often one or more cold cathode fluorescent lamps ("CCFLs"). Physically, CCFLs appear somewhat like miniaturized versions of the fluorescent light tubes used in commercial office buildings. However, CCFLs produce light in a different manner than those commercial fluorescent lights. More recently, the use of CCFLs has given way to the use of one or more light emitting diodes ("LEDs") as the light source in information displays. LED technology presently is the most common backlight type for LCD displays. It is expected that in future backlit displays, new light-generating technologies may one day replace LEDs.

Close-eye display technology may be used to present information and images to a user as part of a virtual reality ("VR") or augmented reality ("AR") system. Such a close-eye display may be incorporated into a head-mounted display ("HMD") device or headset. HMDs can take mPany forms including helmets, visors, goggles, masks, glasses, and other head or eye wear. In some embodiments, the virtual reality and augmented reality systems comprise additional components, including a controller or computer that generates image information to drive the virtual reality or augmented reality environment. Such environments may be for a single user or for multiple users. HMDs in virtual reality systems and augmented reality systems can use a single information display or use multiple information displays to present images to a user. While these close-eye information displays can be oriented as direct-view, often the information displays are coupled with one or more lenses in the HMD. Such lenses can enhance the virtual reality or augmented reality experience.

Specifically, virtual reality and augmented reality HMDs often use one or more lenses to direct light associated with images displayed on one or more information displays to the user's eye(s). Among other things, lenses are used to bend light from the information di splay(s) so as to make it appear to the user that the information display is farther away than it actually is. This provides the user a greater depth of field in the virtual environment and allows the user to more easily focus on the displayed image. Lenses also can be used in virtual reality and augmented reality headsets to increase the field of view of the information display for the user. A larger field of view can increase the immersive effect of the virtual reality or augmented reality system. Lenses can further be used in virtual reality or augmented reality headsets to shape the light from a single display so that the light received by the user is tailored separately for the user's left and right eyes. Use of separately tailored images for each eye can cause the user to perceive a stereoscopic or three-dimensional image.

While conventional spherical lenses can be used in virtual reality and augmented reality HMDs, often one or more lenses with Fresnel features is used. This is because as compared to conventional lenses, Fresnel lenses can offer greater lens power for a given physical lens size. High lens power is often desirable in virtual reality and augmented reality headsets to achieve some or all of the above-identified objectives.

Traditional information displays, whether directly-emissive displays, such as organic light emitting displays ("OLED"), or backlit displays, such as liquid crystal displays, typically emit light over a broad angular cone or field of view. The angular divergence of these traditional displays can range upwards of 160 degrees and even approach 180 degrees. When directly viewed, this angularly broad light generally does not cause undesirable effects. However, when traditional information displays are employed in an HMD, such as in a virtual reality or augmented reality system, the angularly broad emissions can lead to undesirable results. This is the case when the light emitted by the information display strikes the lenses of the HMD at incoming angles that are beyond the imaging capability of the lenses. Such light is not properly imaged to the user's eye(s). Instead, light at angles beyond the focusing capability of the HMD's lens(es) can result in undesirable visual effects like flood illumination, ghosting, glare, scatter, and other stray light effects. This stray non-imaged light can result in the user of the virtual reality or augmented reality headset experiencing undesirable visual artifacts. Accordingly, it is desirable to address the limitations in the art.

BRIEF DESCRIPTION OF THE DRAWINGS

By way of example, reference will now be made to the accompanying drawings, which are not to scale.

DETAILED DESCRIPTION

Those of ordinary skill in the art will realize that the following description is illustrative only and not in any way limiting. Other embodiments will readily suggest themselves to such skilled persons, having the benefit of this disclosure. Reference will now be made in detail to specific implementations as illustrated in the accompanying drawings. The same reference numbers will be used throughout the drawings and the following description to refer to the same or like parts.

One of the design objectives of traditional backlit displays is a wide viewing angle. For example, one of the selling points of LCD displays that use in-plane switching ("IPS") technology over typically lower cost twisted nematic ("TN") technology is that displays that use in-plane switching produce an image with a wider viewing angle. These technologies generally refer to the display matrix portion of the LCD display. Displays using either type of technology could theoretically use the same backlight assembly. A wider viewing angle allows a user of the information display to see a quality image even when they are positioned well off-axis of the display. For a wide viewing angle display, what a user sees in an off-axis position will be similar to what a user sees when positioned directly in front of the display. To facilitate a wider viewing angle, traditional backlit displays use a backlight assembly that emits a wide angular cone of light of up to 180 degrees.

Close-eye display systems, such as virtual reality and augmented reality systems are increasing in use and popularity. Close-eye displays are typically incorporated into a head-mounted display device or headset. In some embodiments, HMDs use a single information display to present images to a user, while other embodiments use multiple information displays, such as one display for each eye. Often the information displays in HMDs are coupled with a lens assembly that comprises, for example, one or more lenses. The lens assembly can enhance the virtual reality or augmented reality experience.

When traditional information displays are used in an HMD that comprises a lens assembly, the wide viewing angle of the display, which is a desirable objective in traditional use, can be a detriment. This is because some of the light emitted by the information display strikes the lens of the HMD at incoming angles that are beyond the imaging capability of the lens. Imaging lenses have a numerical aperture ("NA"), which relates to the range of angles of the cone of light over which a lens can accept light and produce a focused image. Light that strikes the lens at angles beyond this range will not be imaged, and instead will undesirably scatter as stray light and flood illuminate, produce ghost images, and the like. Accordingly, it may be desirable to limit the angular cone of light reaching the lens assembly of an HMD.

Although for the reasons discussed, it may be desirable to limit the angular cone of light reaching the lens assembly of an HMD, counterintuitively, reducing the angular cone of light of an information display to near-zero, i.e. a display that emits essentially coherent light perfectly perpendicular to the LCD matrix, yields undesirable results. This is because although images created with such coherent light could be focused by a typical HMD lens assembly, the lens assembly essentially would image the light to a single point. Thus, the area where a user of such an HMD would see a focused image is very small. This area is often known as the eye box of the HMD. When the user's eye is outside of the HMD's eye box, the user will not see a satisfactory image. To accommodate physical differences among users of an HMD as well as variability in how an HMD is positioned relative to the eyes of a user, a designer may wish to offer an HMD where the eye box is of adequate size. For example, a 10 millimeter eye box (measured laterally) may suitably accommodate a wide variety of users. Some designers may opt for a smaller eye box, such as 5 millimeters or less, and some designers may opt for a larger eye box, of up to 25 millimeters or more.

In an HMD where the lens assembly comprises a single lens, a designer can use the desired size of the eye box (or a defined eye box range) combined with the focal length of the lens to determine the approximate angular cone of incoming light that is suitable. In contrast to the wide angular cone of a traditional information display, in an HMD configuration, an angular cone of 10 to 15 degrees may be optimal. Such an angular cone may provide for an adequate size eye box, while allowing the light generally to be imaged rather than scattered. Some designers may design for a narrower angular cone of up to 5 or 10 degrees, and some designers may design for a greater angular cone of greater than 15 degrees. However, it is unlikely that a designer will seek to have an angular cone of light greater than about 45 degrees.

To reduce the angular cone of light reaching the lens assembly from a backlit information display, the angular cone of light emitted by the backlight assembly may be narrowed. For backlit LCD displays, the angle of light emitted by the display is generally similar to the angle of light produced by the backlight assembly. In other words if the backlight assembly produces a large angular cone of light, the LCD display likely will emit a large angular cone of light; and if the backlight assembly produces a small angular cone of light, the LCD display likely will emit a small angular cone of light. Thus, a low divergence angle backlight assembly can be desirable in HMD applications, such as virtual reality and augmented reality systems.

Figure 1:
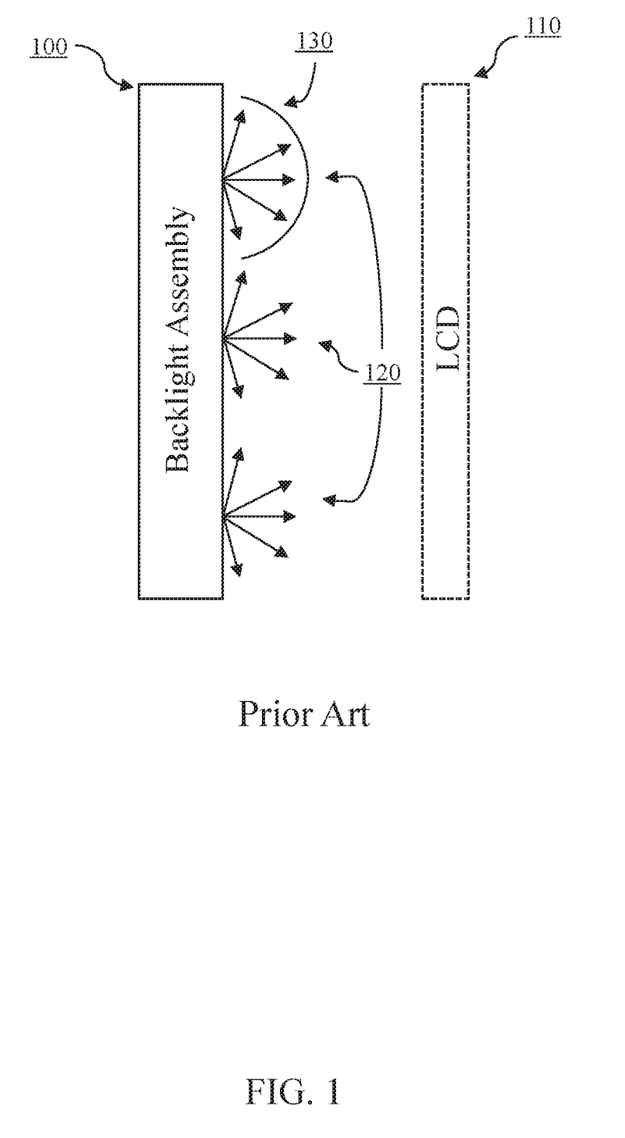
FIG. 1 depicts aspects of a prior art backlight assembly of an LCD display.

FIG. 1 shows a side view of components of a prior art backlit LCD display. FIG. 1 shows backlight assembly 100, which emits light 120. The light source in the backlight assembly could be any available light source such as one or more CCFLs or one or more LEDs. The light source in the backlight assembly would traditionally be broad spectrum in nature, i.e. white light, so that the prior art LCD display could produce color images across the visible spectrum. While for simplicity, FIG. 1 shows emitted light 120 at three distinct points on the front face of the backlight assembly, those of ordinary skill will realize that the backlight assembly 100 emits light generally uniformly across its entire front face. Arc 130 reflects the angular cone of light output by the backlight assembly. In this example, the backlight assembly may emit light over a range of about 160 to 180 degrees. Prior art LCD backlight assemblies typically emit light over a range of angles up to nearly 180 degrees (light that is just shy of parallel to the face of the backlight assembly). This range of emission angles is sometimes referred to as the backlight assembly's field of view or the backlight assembly's cone of light. FIG. 1 also shows LCD 110, which is a liquid crystal display matrix. The liquid crystal display matrix, which itself is made up of several components including one or more polarizing layers, a liquid crystal layer, and a thin film transistor layer, is the portion of the display that creates the image. The liquid crystal display matrix creates images by obscuring portions of the backlight on a very granular basis. When light 120 emitted from backlight assembly 100 passes through LCD 110, an image is displayed. For clarity, FIG. 1 shows separation between the backlight assembly 100 and LCD 110. However, in most implementations, these two components are sandwiched together with very little, if any, space between them.

Figure 2:
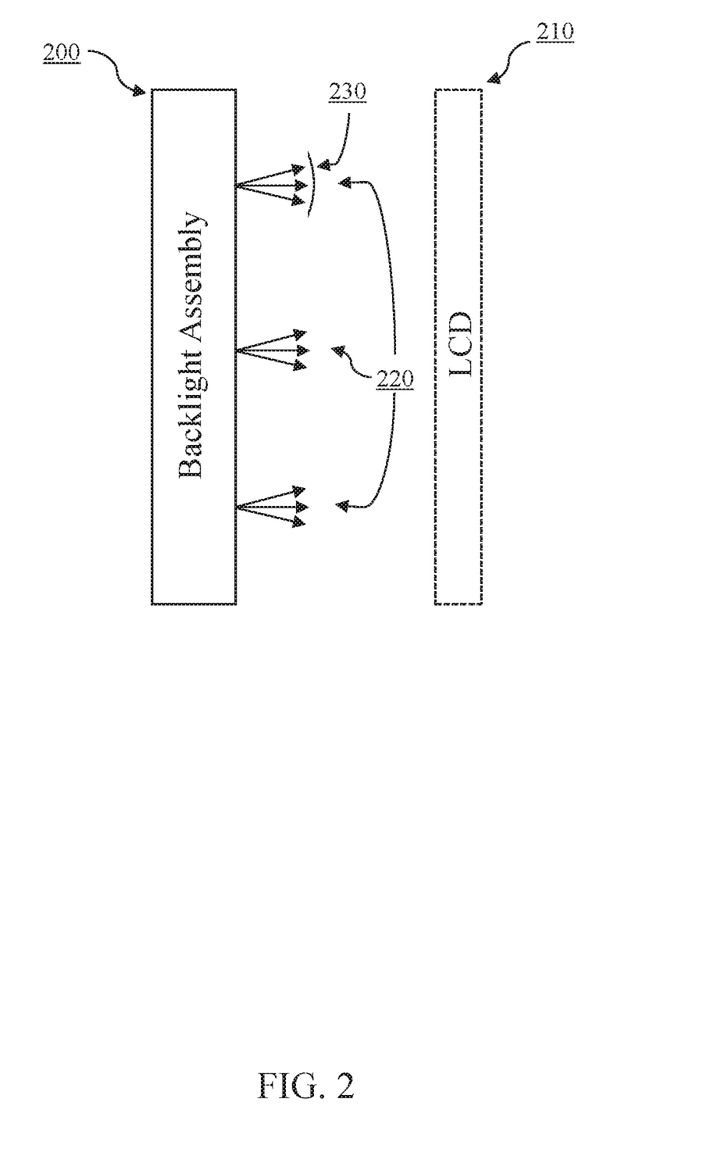
FIG. 2 depicts aspects of a narrow angle backlight assembly of an LCD display according to certain embodiments.

In some embodiments, FIG. 2 may depict a side view of components of a backlit LCD display with a narrow angle backlight assembly. FIG. 2 shows backlight assembly 200, which emits light 220. The light source in the backlight assembly could be any available light source such as one or more CCFLs, one or more LEDs, one or more lasers, quantum dots, another light source, or any combination of any of these. To permit the display to produce color images, the light source(s) in backlight assembly 200 is/are able to produce a broad spectrum or white light, and may produce white light directly or may produce individual colors of light, such as red, green, and blue, which combine to create generally white light. While for simplicity, FIG. 2 shows emitted light 220 at three distinct points on the front face of backlight assembly 200, those of ordinary skill will realize that backlight assembly 200 desirably emits light generally uniformly across its front face. Arc 230 reflects the angular cone of light emitted by backlight assembly 200. Although arc 230 refers to light emitted from one point on the backlight assembly, those of ordinary skill will realize the light emitted across the front face of backlight assembly 200 will have generally the same angular cone. In some embodiments, backlight assembly 200 emits light 220 over an angular range of about 15 degrees. The angular range over which light 220 is emitted is also referred to herein as the maximum angle of the cone of light (or of arc 230). The maximum angle of the cone of light (or of arc 230) and the directions of chief rays associated with the cone of light may correspond to a defined eye box range, such as an eye box range of about 5 millimeters, 10 millimeters, or 25 millimeters, suitable for HMD applications. FIG. 2 also shows LCD 210, which is a liquid crystal display matrix, and which can be the same as LCD 110 in FIG. 1. When light 220 emitted from backlight assembly 200 passes through LCD 210, an image is displayed. For clarity, FIG. 2 shows separation between backlight assembly 200 and LCD 210. However, in most implementations, these two components will be sandwiched together with very little, if any, space between them.

Figure 3:
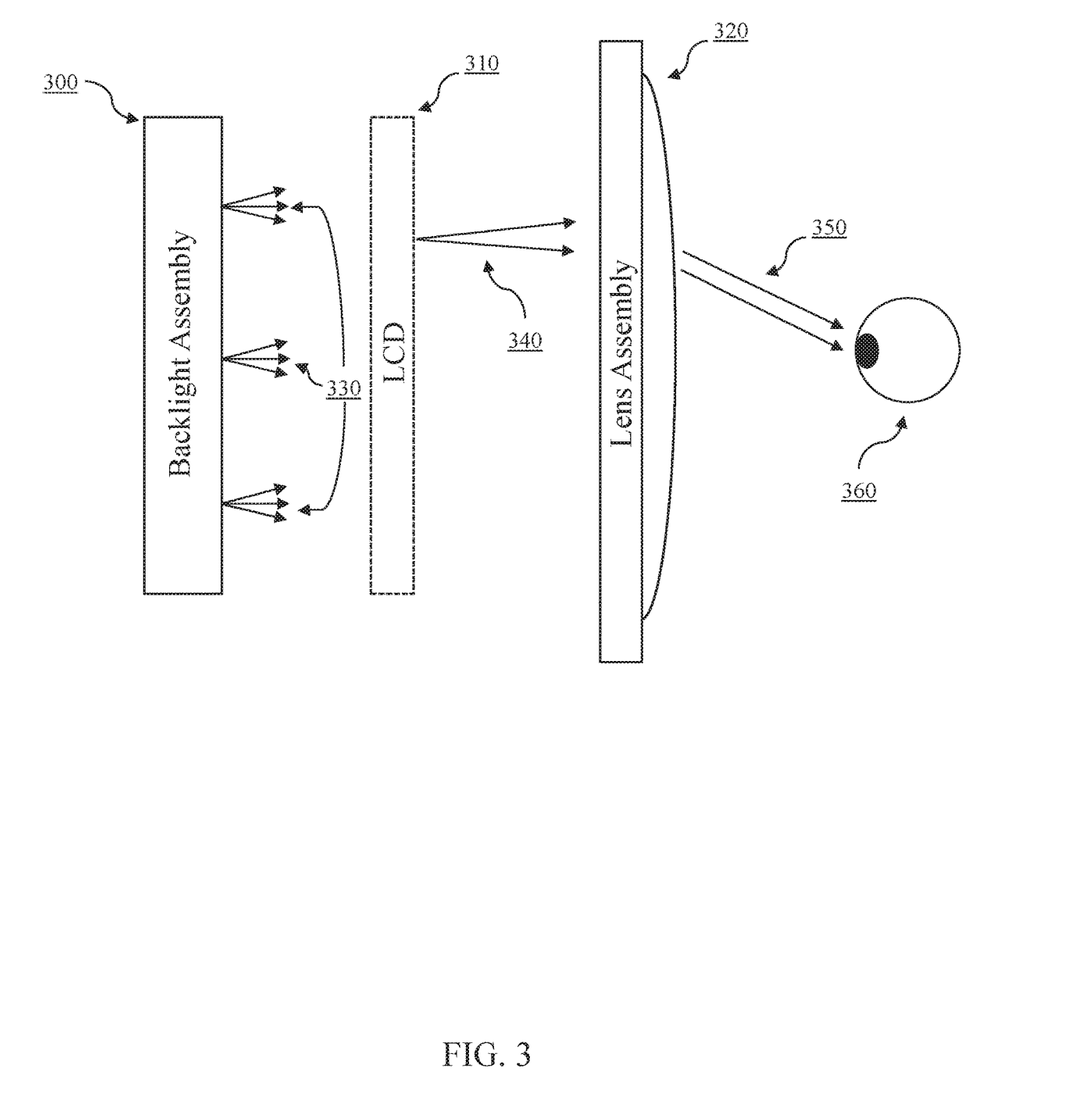
FIG. 3 depicts aspects of a close-eye display with a narrow angle backlight assembly LCD according to certain embodiments.

In certain embodiments, FIG. 3 may depict a backlit LCD display with a narrow angle backlight assembly in a head-mounted display configuration, such as in a virtual reality or augmented reality headset. FIG. 3 shows backlight assembly 300 emitting light 330 with a narrow angular cone of up to about 20 degrees, which may represent the maximum angle of the cone of light. The maximum angle of this cone of light (e.g., which may be about 20 degrees) and the directions of chief rays associated with the cone of light may correspond to a defined eye box range, such as an eye box range of about 5 millimeters, 10 millimeters, or 25 millimeters, suitable for HMD applications. The light emitted by backlight assembly 300 passes through LCD 310 thereby displaying a visible image. Light 340 exiting LCD 310, then passes through lens assembly 320, which comprises one or more lenses. In certain embodiments, the lens(es) in lens assembly 320 can be conventional spherical, aspherical, Fresnel, or any other type of imaging lens. Lens assembly 320 may have lens faces of a single type, or could be combinations of any or all of these lens types. In some implementations, lens assembly 320 may have a pancake configuration, which may comprise a polarization-based reflective or refractive optical system. In this case, lens assembly 320 may comprise an assembly of optical elements configured to direct light from LCD 310 toward user's eye 360 using on-axis optical folding based, at least in part, on polarization of the light. Lens assembly 320 may include various optical elements other than a lens. For example, lens assembly 320 may include at least one polarizing beam splitter and a substrate comprising twisted liquid crystal elements. The twisted liquid crystal elements may be configured to modify phase of the light within the lens assembly. Light 350 exits the lens assembly directed towards the user's eye 360. In some embodiments, light 350 creates an eye box of approximately 10 millimeters. Those of ordinary skill will realize that FIG. 3 is not meant to depict the physical design or layout of an HMD system, but rather the general flow of light among the depicted components in some embodiments.

In certain embodiments, a head-mounted display is designed to be seen by both the left and right eyes of the user. This can be achieved using separate left and right LCD displays, or can be achieved using a single LCD display. Similarly, the virtual reality or augmented reality headset could comprise a single lens assembly or it could use individual left and right lens assemblies.

Figure 4:
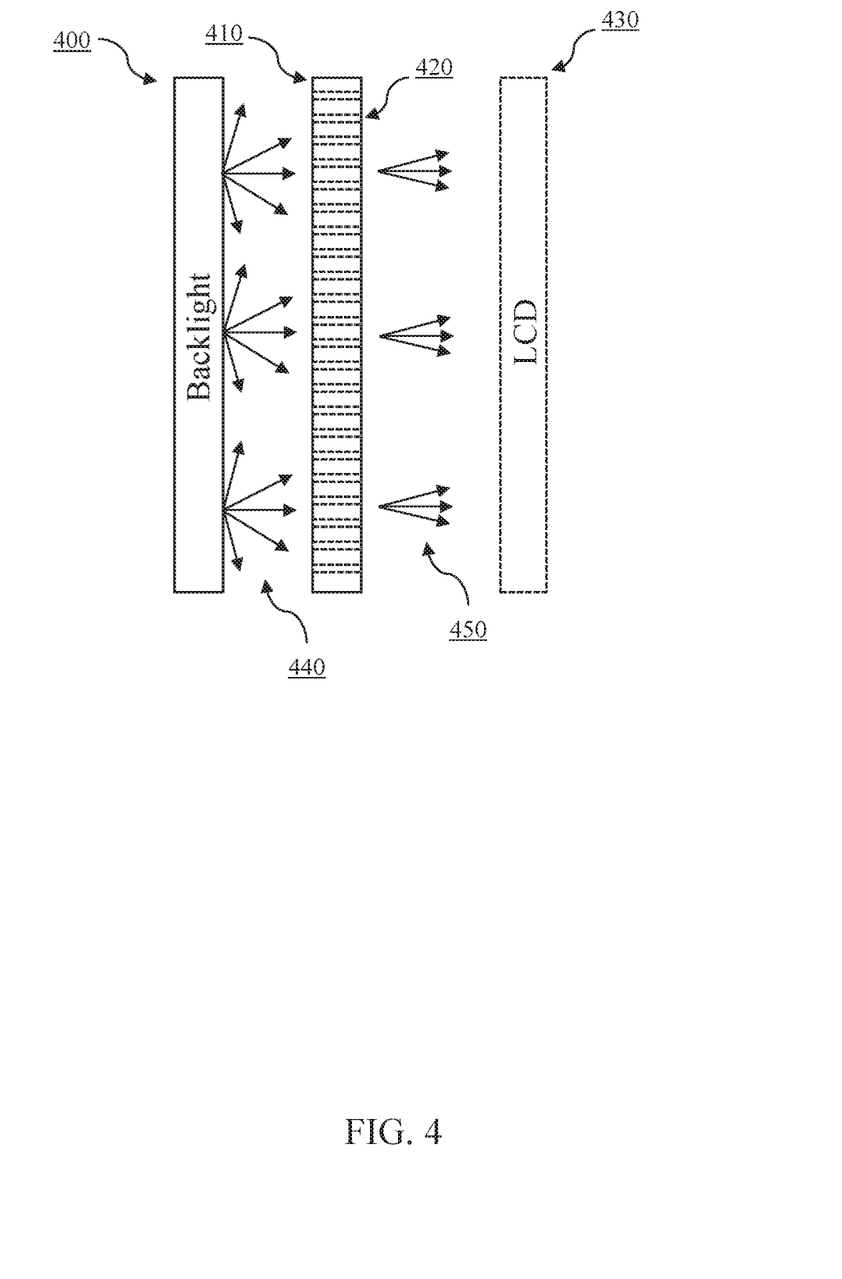
FIG. 4 depicts aspects of an exemplary narrow angle backlight assembly according to certain embodiments.

In certain embodiments, a wide angle backlight from a traditional backlit display may be modified to narrow the angular cone of light emitted. FIG. 4 shows a side view of an exemplary narrow angle backlight assembly according to certain embodiments for use in a backlit display in a head-mounted display. In FIG. 4, backlight 400 is a traditional backlight that emits light 440 with a large angular cone up to about 160 to 180 degrees. Light 440 emitted by backlight 400 interacts with angle-restricting layer 410. In this configuration, the backlight assembly can be seen as backlight 400 in combination with the angle-restricting layer 410. That is, the angle-restricting layer 410 can be a component of the backlight assembly. Angle-restricting layer 410 has extended holes or tubes, 420, that extend through the angle-restricting layer 410 and allow light within the desired angular range to pass as light 450, while attenuating light at angles greater than the desired angular range. The array of holes or tubes 420 is an example of an array of light conductors that are individually configured to attenuate the cone of light 440 emitted by the backlight 400. This attenuation can be based, at least in part, on angles that the light 400 strikes the light conductors of the angle-restricting layer 410. For example, the light conductors (e.g., holes or tubes 420) of the angle-restricting layer 410 may reduce the cone of light 440 emitted by the backlight 400 by blocking light striking the angle-restricting layer 410 at angles too large to pass through each of the light conductors (e.g., holes or tubes 420). The dimensions of the extended holes or tubes 420 in angle-restricting layer 410 will dictate the range of angles of light that will pass through the layer. Specifically, the diameter of the holes or tubes 420 combined with the depth of the angle-restricting layer 410 or length of the holes or tubes 420 will dictate the range of angles of light that will pass through angle-restricting layer 410. In some embodiments, each of the light conductors (e.g., holes or tubes 420) has a ratio of length of the light conductor to width (e.g., diameter) of the light conductor that is small enough to substantially avoid diffraction of the cone of light 450 at an exit of the light conductor. In some embodiments, a width (e.g., diameter) of an individual light conductor is greater than about 10 microns to avoid diffraction of the cone of light 450 at an exit of the light conductor. Light at angles greater than the designed range will be attenuated by angle-restricting layer 410. Light 450 with a narrow angular cone then passes through the LCD 430 to display an image. The maximum angle of this cone of light 450 and the directions of chief rays associated with the cone of light 450 may correspond to a defined eye box range, such as an eye box range of about 5 millimeters, 10 millimeters, or 25 millimeters, suitable for HMD applications. The LCD 430 is an example of a pixelated display panel configured to generate an image. It is to be appreciated that other types of pixelated display panels can be used in place of the LCD 430 of FIG. 4. In some implementations, extended holes or tubes 420 of the angle-restricting layer 410 include an interior surface that attenuates light that strikes this surface. Without this feature, in some situations, extended holes or tubes 420 may act similarly to an optical fiber, which need not reduce cone angle. The interior surface of the holes or tubes 420 of the angle-restricting layer 410 may be a substantially non-reflective (or anti-reflective) surface, such as a black and/or frosted surface, for example. In some implementations, such a frosted or rough surface may comprise randomly placed and/or sized surface relief features that are large relative to the wavelength(s) of the light.

In some implementations, extended holes or tubes 420 of the angle-restricting layer 410 may have a conical or tapered shape instead of a cylindrical shape. For example, an angle of such a conical shape may provide for modifying the cone angle of light 450. In this case, extended holes or tubes 420 would comprise an interior surface that does not substantially attenuate light that strikes this surface (e.g., a reflective surface is desirable).

While the depicted angle-restricting layer 410 contains holes, (e.g., hollow light conductors with air being the fluid medium within the hollow light conductors) in certain embodiments, the angle-restricting layer 410 could include portions (e.g., rods) that are made of light-transmissive material such as glass or plastic, or the like, or another material with light-transmissive properties. Accordingly, the angle-restricting layer 410 may include light conductors that are either holes/tubes, or portions of the angle-restricting layer 410 made of a light-transmissive material. Naturally, if the angle-restricting layer 410 includes light-transmissive material (as opposed to holes), then the dimensions of the tubes necessary to achieve a targeted angular cone will depend in part on the properties (e.g., indices of refraction) of the material used.

In some embodiments, one possible disadvantage of including an angle-restricting layer 410 is that the layer may result in a lack of illumination uniformity. This is because areas where there are holes may appear brighter and areas in between the holes may appear darker. Such a lack of uniformity is generally undesirable in an information display backlight assembly. In some embodiments, uniformity may be improved by adding a homogenizing layer, such as a homogenizing layer positioned between the angle-restricting layer 410 and the pixelated display panel (e.g., LCD 430). In some embodiments, uniformity may be improved simply by increasing the space between the angle-restricting layer 410 and the back of the pixelated display panel (e.g., LCD 430). This additional space will allow the light passing through the holes or tubes 420 to spread out, which operates to even out the bright and dark areas.

Imaging lenses have a numerical aperture ("NA"), which relates to the range of angles of the cone of light over which a lens can accept light and produce a focused image Depending on the NA of the lens assembly 320, the lens assembly is capable of directing and focusing light at fairly large angles, such as incoming light at angles of about 160 degrees. That is, the lens assembly 320 may be capable of accepting a cone of light at angles within a range of angles from zero to about 160 degrees, depending on the NA of the lens assembly 320. Meanwhile, the light 450 that exits the angle-restricting layer 410 and that passes through the pixelated display panel (e.g., LCD 430) to display an image has a relatively narrow angular cone, such as a cone of light 450 up to about 45 degrees about the chief ray, up to about 15 degrees about the chief ray, up to about 10 degrees about the chief ray, or up to about 5 degrees about the chief ray. Thus, the lens assembly 320 used with the display assembly of FIG. 4 (e.g., the backlight assembly 400, angle-restricting layer 410, the pixelated display panel (e.g., LCD 430), etc.) is capable of directing and focusing light at an angle about the chief ray that is substantially greater than a maximum angle of the cone of light 450 about the chief ray. Here "substantially greater" may mean at least 50 degrees greater. In some embodiments, "substantially greater" in this context may mean that the angle of light the lens assembly 320 is capable of accepting to focus an image may be at least 115 degrees greater than the maximum angle of the cone of light 450.

Figure 5:
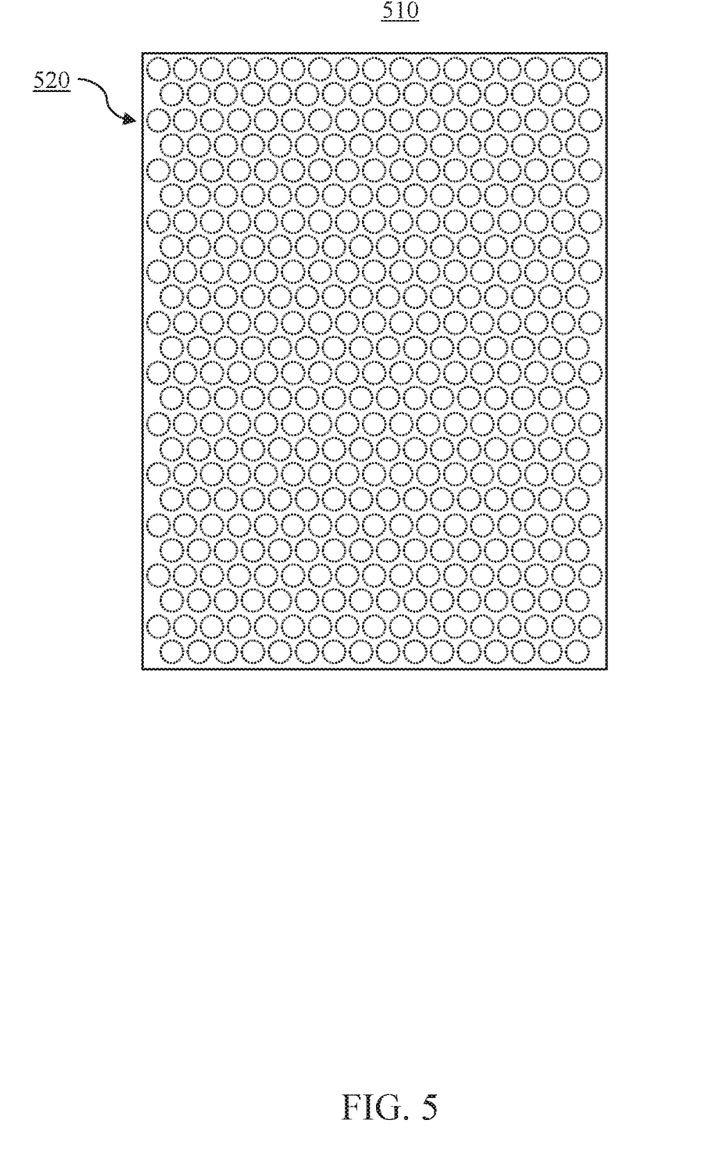
FIG. 5 depicts a view of an exemplary angle-restricting layer of a narrow angle backlight assembly according to certain embodiments.

In certain embodiments, FIG. 5 shows a front view of angle-restricting layer 510, which may be the same as, or similar to, the angle-restricting layer 410 in FIG. 4. FIG. 5 further depicts a front view of the tubes or holes 520 in angle-restricting layer 510. The depicted cross-section of the tubes or holes 520 is generally circular. However, in certain embodiments, other hole or tube cross-sectional shapes could also be used. For example, holes with cross-sections that are ovular, rectangular, hexagonal, and the like could be used. Generally, the more the cross-section of the holes deviates from being circular, the more gradual the attenuation of light beyond the designed range of angles will be.

It should be noted that in these embodiments and the embodiments throughout this disclosure, there does not need to be, nor is there likely to be, a binary cutoff at the boundary of the desired angular range. In other words, if the desired angular range is up to 15 degrees, there does not need to be zero light emitted (or transmitted through the angle-restricting layer) at 16 degrees or even 20 degrees or more. Instead, there is likely to be a gradual attenuation of light greater than the desired range. Indeed, in some embodiments the attenuation could begin at the desired boundary, say an angular cone of 15 degrees, and extend well beyond this desired range before the amount of light emitted (or passing through the angle-restricting layer) is imperceptibly small. In some embodiments the attenuation could be set to begin at angles within the desired range, but still extend well beyond the desired range before the amount of light emitted is imperceptibly small. In this sense, when a cone of light is said to have a "maximum" angle, the term "maximum" is not to be understood as an absolute binary cutoff of the angular range of the cone of light, and there may be some light emitted at angles greater than the "maximum" angle (e.g., with a maximum angle of 15 degrees, some light may be emitted at angles of 16 degrees or greater), but the light beyond this maximum angle gradually attenuates as the angle widens beyond the "maximum" angle.

One potentially undesirable impact of the use of an angle-restricting layer is that the layer is likely to reduce the efficiency of the backlight. This is because the angle-restricting layer generally attenuates the portion of the emitted light that is greater than the designed angular range of the layer. Thus, the light emitted by the backlight beyond the designed angular range does not illuminate the LCD. Accordingly, in some embodiments the expected efficiency of such a design may be in the 10 to 20% range or lower, with the remaining 80 to 90% of light being attenuated by the angle-restricting layer. Accordingly, to produce a generally equivalent display brightness as a display without an angle-restricting layer, a backlight with approximately five to ten times the light output, or more, may be necessary.

Figure 6:
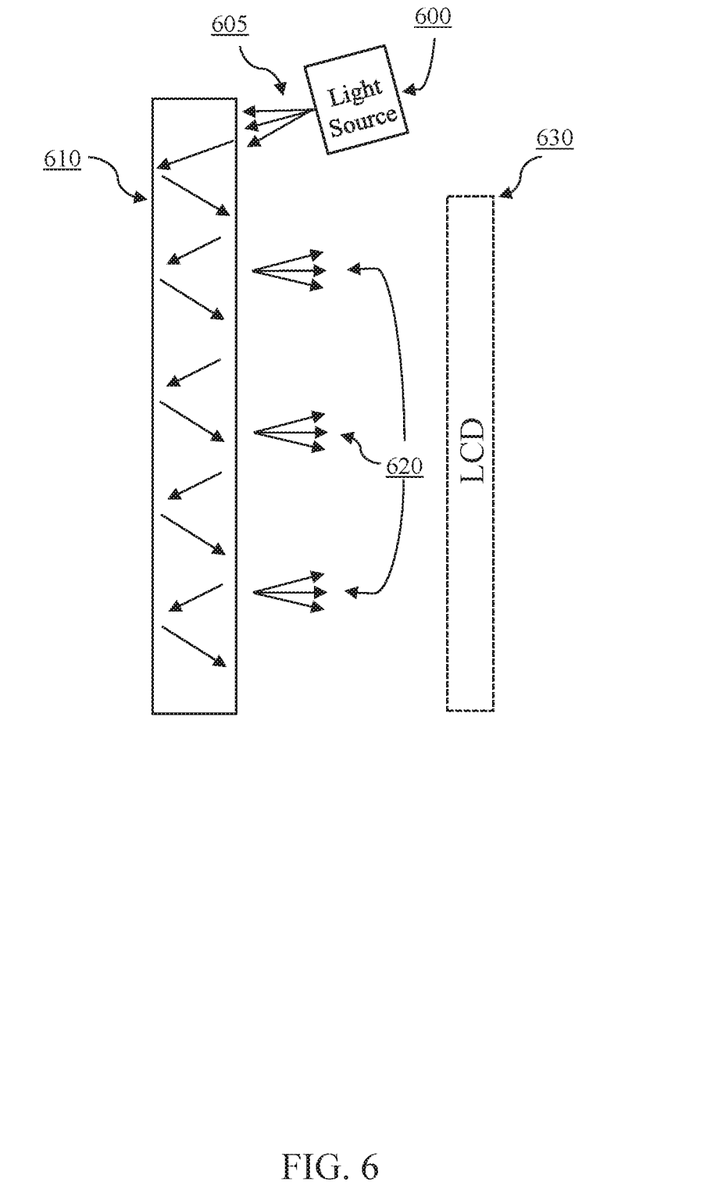
FIG. 6 depicts aspects of a side view of an exemplary narrow angle backlight assembly according to certain embodiments.

FIG. 6 shows a side view of an exemplary narrow angle backlight assembly according to certain embodiments for use in a head-mounted display. In FIG. 6, narrow angle light source 600 directs light into angle-preserving waveguide 610. Narrow angle light source 600 comprises one or more light sources that emit light 605 with a narrow angular cone. In certain embodiments narrow angle light source 600 comprises a plurality of light sources to improve uniformity in the 'z' axis (i.e. in the dimension coming out from FIG. 6). In certain embodiments, narrow angle light source 600 may comprise relatively coherent light, such as from one or more lasers or one or more sets of red, green, and blue (RGB) lasers, for example. In some embodiments, the narrow angle light source 600 may include a set of one or more RGB infrared (IR) lasers. In other embodiments, narrow angle light source 600 may comprise one or more other types of light emitting sources, such as LEDs. In still other embodiments, narrow angle light source 600 may comprise a light source that does not naturally produce narrow angle light, but, when coupled with a collimating lens assembly, yields the desired narrow angle light 605. Generally, collimated light is light whose rays are substantially parallel. Accordingly, collimated light does not substantially diverge or converge as it propagates. However, as applied to embodiments described herein, it is to be understood that so-named "collimated light" or "collimating lens" need not refer to light that is (or will be) perfectly collimated. Instead, such terms are associated with light that is at least substantially collimated light beam, and therefore some divergence or convergence of light may be present.

Light propagates through angle-preserving waveguide 610 by Fresnel reflections. In some embodiments, light can be made to exit the front face of angle-preserving waveguide 610 through the use of microstructures or diffractive elements, such as gratings, micro-prisms, or parabolic spheres. In some embodiments, light can be made to exit the front face of angle-preserving waveguide 610 through the use of beam splitters or coatings, or the like. In some embodiments, angle-preserving waveguide 610 is an angle preserving spatial homogenizer. Light 620 exits angle-preserving waveguide 610 with generally the same angular range as light 605 entering the waveguide and emitted by narrow angle light source 600. While for simplicity, FIG. 6 shows light 620 being emitted from the front face of waveguide 610 at three distinct points, those of ordinary skill will realize that waveguide 610 desirably emits light in a generally uniform fashion across its front face. Narrow angle light source 600 combined with angle-preserving waveguide 610 constitute a narrow angle backlight assembly. Light 620 with a narrow angular cone then passes through the LCD 630 to display an image. The maximum angle of this cone of light 620 and the directions of chief rays associated with the cone of light 620 may correspond to a defined eye box range, such as an eye box range of about 5 millimeters, 10 millimeters, or 25 millimeters, suitable for HMD applications. For clarity, FIG. 6 shows separation between the angle-preserving waveguide 610 and LCD 630. However, in most implementations, these two components likely will be sandwiched together with very little, if any, space between them. In some embodiments, light exiting LCD 630 is directed to a lens assembly of an HMD. The lens assembly of the HMD focuses the image from LCD 630 in an eye box of the HMD.

Figure 7:
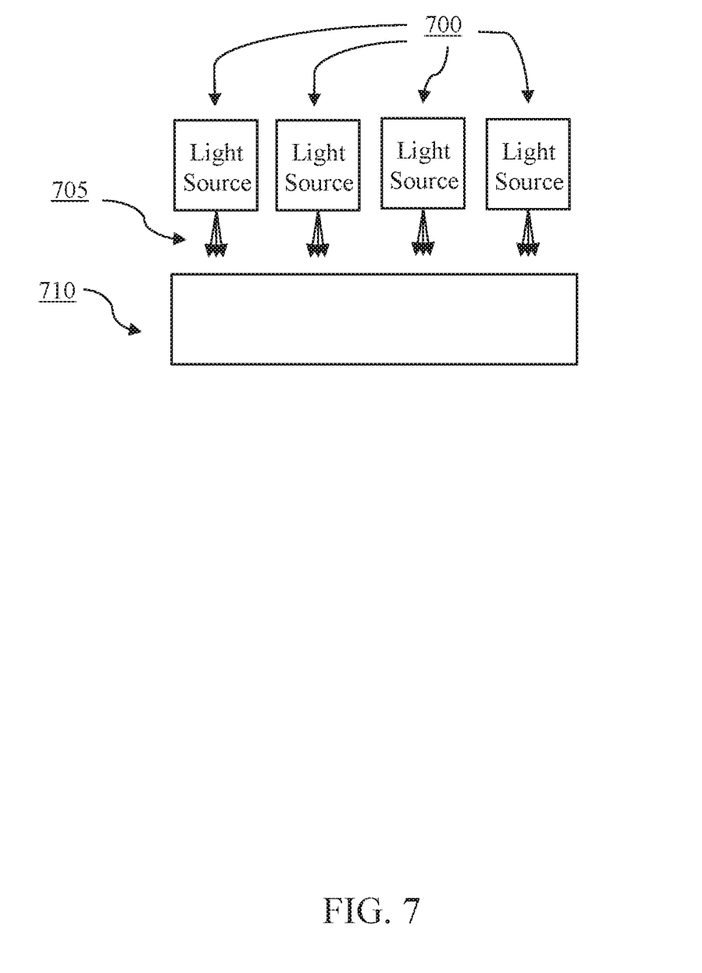
FIG. 7 depicts aspects of a top view of an exemplary narrow angle backlight assembly according to certain embodiments.

In some embodiments, FIG. 7 reflects aspects of a top view of narrow angle light source 600 and angle-preserving waveguide 610 of FIG. 6. FIG. 7 reflects that in some embodiments narrow angle light source 600 comprises a plurality of narrow angle light sources 700. In certain embodiments, narrow angle light sources 700 may comprise relatively coherent light, such as from one or more lasers or one or more sets of red, green, and blue (RGB) lasers, for example. In some embodiments, the narrow angle light sources 700 may individually include a set of one or more RGB infrared (IR) lasers. In other embodiments, narrow angle light sources 700 may comprise one or more other types of light emitting sources, such as LEDs. In still other embodiments, narrow angle light sources 700 may comprise light sources that do not naturally produce narrow angle light, but, when coupled with a collimating lens assembly, yields the desired narrow angle light 705. The maximum angle of this cone of light 705 and the directions of chief rays associated with the cone of light 705 may correspond to a defined eye box range, such as an eye box range of about 5 millimeters, 10 millimeters, or 25 millimeters, suitable for HMD applications. The plurality of narrow angle light sources 700 are arranged such that light 705 emitted from narrow angle light sources 700, and which enters angle-preserving waveguide 710, generally is homogenous in the 'z' axis dimension.

Figure 8:
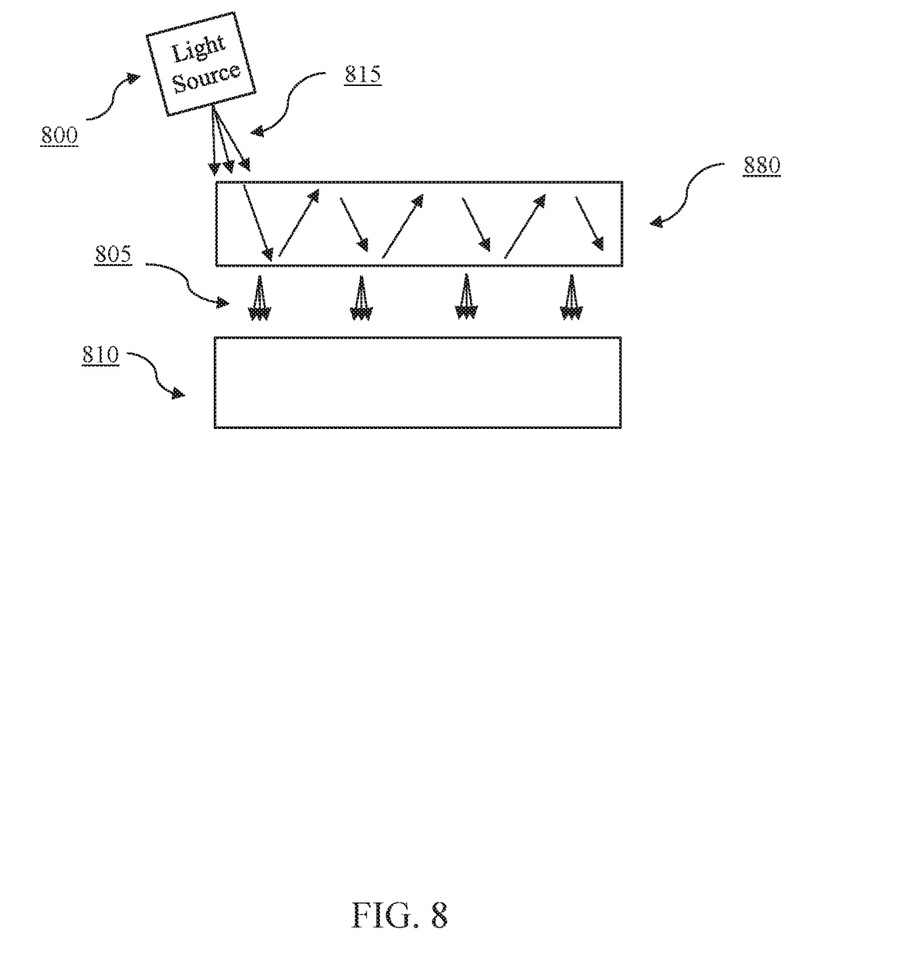
FIG. 8 depicts aspects of a top view of an exemplary narrow angle backlight assembly according to certain embodiments.

In some embodiments, FIG. 8 reflects aspects of a top view of narrow angle light source 600 and angle-preserving waveguide 610 of FIG. 6. FIG. 8 reflects that in some embodiments narrow angle light source 600 comprises narrow angle light source 800 coupled to second angle-preserving waveguide 880. In FIG. 8, narrow angle light source 800 directs light into angle-preserving waveguide 880. In certain embodiments, narrow angle light source 800 may comprise relatively coherent light, such as from one or more lasers or one or more sets of red, green, and blue (RGB) lasers, for example. In some embodiments, the narrow angle light source 800 may include a set of one or more RGB infrared (IR) lasers. In other embodiments, narrow angle light source 800 may comprise one or more other types of light emitting sources, such as LEDs. In still other embodiments, narrow angle light source may comprise a light source that does not naturally produce narrow angle light, but, when coupled with a collimating lens assembly, yields the desired narrow angle light 815.

Light propagates through angle-preserving waveguide 880 by Fresnel reflections. In some embodiments, light can be made to exit angle-preserving waveguide 880 through the use of microstructures or diffractive elements, such as gratings, micro-prisms, or parabolic spheres. In some embodiments, light can be made to exit angle-preserving waveguide 880 through the use of beam splitters or coatings, or the like. In some embodiments, angle-preserving waveguide 880 is an angle preserving spatial homogenizer. Light 805 exits angle-preserving waveguide 880 with generally the same angular range as light 815 entering the waveguide and emitted by narrow angle light source 800. The maximum angle of this cone of light 805 and the directions of chief rays associated with the cone of light 805 may correspond to a defined eye box range, such as an eye box range of about 5 millimeters, 10 millimeters, or 25 millimeters, suitable for HMD applications. Light 805, which enters angle-preserving waveguide 810 (a top view of angle-preserving waveguide 610 of FIG. 6), generally is homogenous in the 'z' axis dimension.

An advantage of using one or more narrow angle light sources is that the resulting backlight assembly is likely to be more efficient than an embodiment that uses a backlight assembly comprising a traditional wide angle backlight and an angle-restricting layer. This is because in certain embodiments more of the light emitted by the narrow angle light source will reach and illuminate the LCD image than in embodiments that use a wide angle backlight coupled to an angle-restricting layer.

Figure 9:
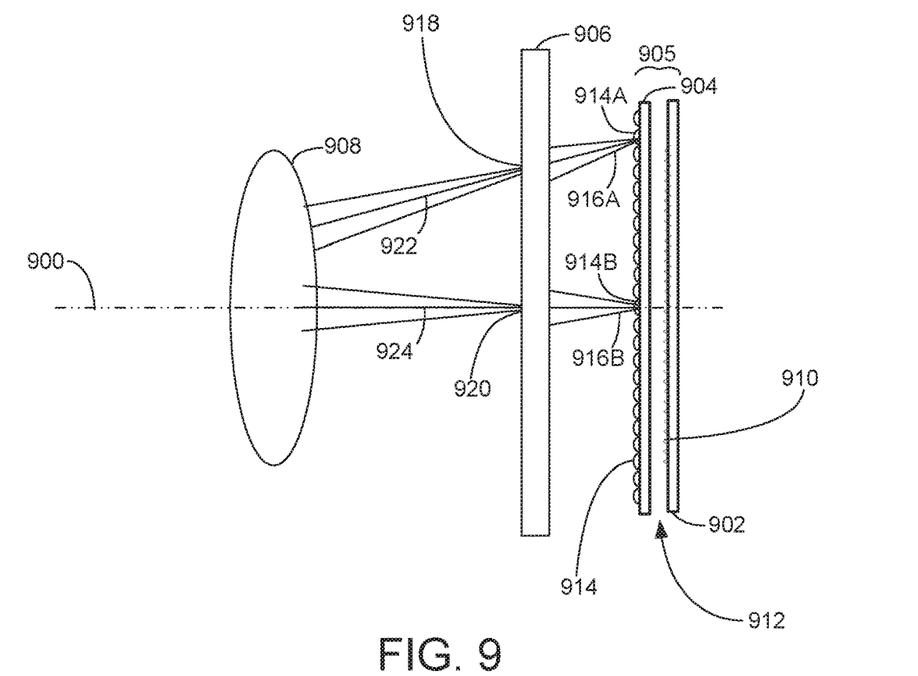
FIG. 9 depicts aspects of a side view of an exemplary narrow angle backlight assembly according to certain embodiments.

In some embodiments, FIG. 9 reflects aspects of a top view of a portion of an optical system along an optical axis 900 that includes a waveguide 902, a microlens array (MLA) 904, LCD 906, and lens assembly 908. Though lens assembly 908 is depicted as a single lens, the lens assembly may comprise one or more elements including lenses, or other types of reflective and/or refractive optical elements. Waveguide 902 includes surface reliefs or features 910, such as a wedge prism array, for example, to decouple light carried within waveguide 902 to outside the waveguide and into MLA 904. A gap 912 may exist between waveguide 902 and MLA 904, but otherwise these elements may be physically in contact with one another, thus eliminating such a gap therebetween. In the latter case, waveguide 902 and MLA 904 may be a single, monolithic element, rather than being two separate components sandwiched together, for example. Waveguide 902 and MLA 904, whether a single, monolithic element or two separate components, may be referred to as a backlight assembly 905. MLA 904 includes an array of microlenses 914 having respective numeric apertures (N.A.s) that may vary across the area of the MLA. For example, microlens 914A at a position relatively near an outer edge of MLA 904 may have a different N.A. as compared to microlens 914B at a position relatively near a central axis of MLA 904. Accordingly, a chief ray of a light cone 916A may exit MLA 904 at an angle that is different from a light cone 916B exiting MLA 904. These light cones 916A,B are directed toward respective pixels (two of which are illustrated in the figure) of LCD 906. For example, light cone 916A is directed through LCD pixel 918 and light cone 916B is directed through LCD pixel 920. The cone of light exiting pixel 918 includes a chief ray 922 and the cone of light exiting pixel 920 includes a chief ray 924. In some embodiments, microlenses 914 are configured so that the chief rays of light exiting MLA 904 (e.g., the chief rays of light emitted by the backlight assembly 905) correspond or are at least substantially equal to the chief ray of lens assembly 908. For example, the chief ray of light cone 916A may be substantially equal to chief ray 922. Said another way, directions of chief rays of light emitted by the backlight assembly 905 may substantially match the directions of the chief rays associated with the cone of light emitted from the LCD 906. In this regard, lens assembly 908 may dictate the directions of the chief rays exiting backlight assembly 905. More specifically, a desired or defined eye box range (e.g., a defined eye box location, region, and/or size) may dictate the set of chief rays (or, the approximate angular cone of incoming light) that are to be received by the lens assembly 908, and, hence, may dictate the set of chief rays (or, the approximate angular cone of light) emitted by the backlight assembly 905 to achieve the desired eye box range. In other words, the backlight assembly 905 can be designed or configured to emit an angular cone of light with an associated set of chief rays having directions that provide for a desired or defined eye box range, while allowing the light generally to be imaged rather than scattered (e.g., by reducing the amount of stray light and increasing the total optical output). Accordingly, the maximum angle of the cone of light emitted by the backlight assembly 905 and the directions of chief rays associated with the cone of light may correspond to a defined eye box range, such as an eye box range of about 5 millimeters, 10 millimeters, or 25 millimeters, suitable for HMD applications. Here, "correspond to" the defined eye box range may mean that the output NA and the chief rays of the backlight assembly 905 are be mapped to the defined or desired eye box range.

Figure 10A:
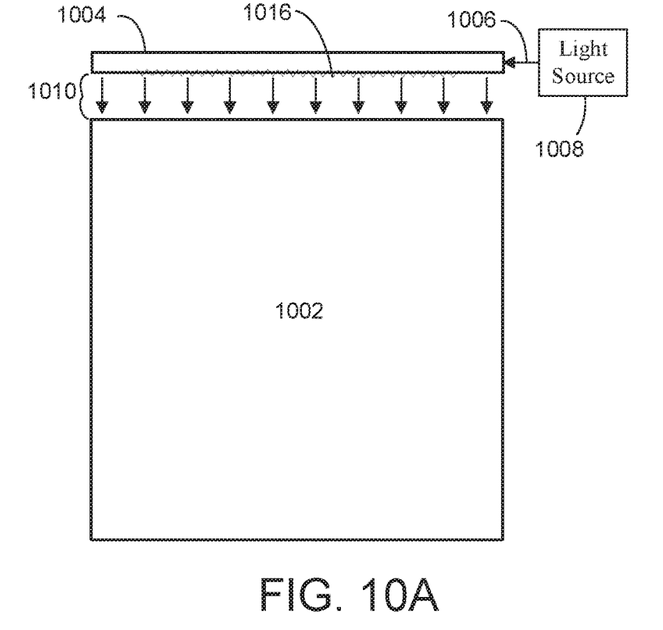
FIG. 10A depicts aspects of a front view of an exemplary wedge prism array utilized in an exemplary backlight assembly according to certain embodiments.
Figure 10B:
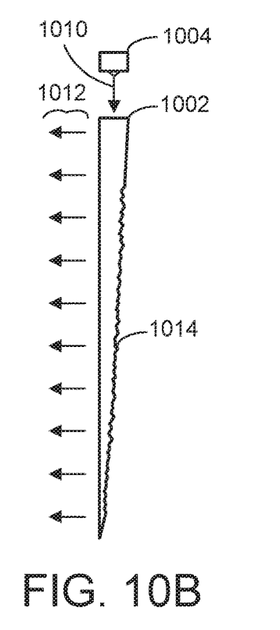
FIG. 10B depicts aspects of a side view of the exemplary wedge prism array of FIG. 10A.

FIG. 10A depicts aspects of a front view of an exemplary wedge prism array utilized in an exemplary backlight assembly according to certain embodiments, while FIG. 10B depicts aspects of a side view of the exemplary wedge prism array shown in FIG. 10A. For example, the waveguide 902 of FIG. 9 may represent the wedge prism array shown in FIGS. 10A and 10B. The wedge prism array may include a first prism 1002 that is wedge-shaped (called a wedge prism 1002) and a second prism 1004 which may or may not be wedge-shaped. The second prism 1004 may receive incoming light 1006 from a light source 1008 (e.g., a laser light source), and may redirect the incoming light 1006 through internal reflections towards the first prism 1002. In this configuration, incoming light 1006 is received at an edge of the second prism 1004 and is output from a planar face of the second prism 1004 as redirected light 1010. The redirected light 1010 may then be received at an edge of the first prism 1002 (the wedge prism 1002), and the first prism 1002 may redirect the light 1010 through internal reflections toward a pixelated display panel (e.g., towards the LCD 906 of FIG. 9). Accordingly, emitted light 1012 is output from a planar face of the first prism 1002. This light 1012 is thereby emitted from the backlight assembly, such as the backlight assembly 905 of FIG. 9. In some embodiments, the light 1012 may pass through additional components of the backlight assembly before the light is received at the pixelated display panel. The wedge prism 1002 shown in FIG. 10B includes a plurality of features, such as prisms 1014, on a planar face of the wedge prism 1002, such as on a rear/back face of the wedge prism 1002 opposite the planar face from which the light 1012 is emitted. As shown in FIG. 10A, the second prism 1004 may also have surface features 1016, such as a plurality of prisms, on a planar face of the second prism 1004, such as on a face from which the redirected light 1010 is emitted.

There may be other combinations not presented here. Therefore, it is understood that descriptions herein are not to be limited to the specific embodiments disclosed, and that modifications and embodiments are intended to be included as readily appreciated by those skilled in the art.

While the above description contains many specifics and certain exemplary embodiments have been described and shown in the accompanying drawings, it is to be understood that such embodiments are merely illustrative and not restrictive, and that claimed subject matter not be limited to the specific constructions and arrangements shown and described, since various other modifications may occur to those ordinarily skilled in the art, as mentioned above. Claimed subject matter includes any combination or subcombination of the elements from the different species and/or embodiments disclosed herein.

The invention claimed is:

1. A head-mounted display comprising:
a display assembly including:
a backlight assembly to illuminate a pixelated display panel;
the pixelated display panel positioned in front of the backlight assembly and configured to generate an image having a corresponding first cone of light; and
a lens assembly configured to direct and focus light of the first cone of light from the pixelated display panel to one or both eyes of a user of the head-mounted display, wherein the lens assembly is capable of directing and focusing light at an angle that is at least 50 degrees greater than a maximum angle of the first cone of light, and wherein the maximum angle of the first cone of light and directions of chief rays associated with the first cone of light correspond to a defined eye box range,
wherein the backlight assembly comprises:
a backlight to emit light of a second cone of light; and
an angle-restricting layer between the pixelated display panel and the backlight, wherein the angle-restricting layer comprises an array of light conductors that each has a width greater than about 10 microns, and each of the light conductors is configured to:
attenuate light of the second cone of light based, at least in part, on angles that the light of the second cone of light strikes the light conductors; and
pass light of the first cone of light to the pixelated display panel.

2. The head-mounted display of claim 1, wherein each of the light conductors comprises a substantially non-reflective surface that is exposed to the light of the second cone of light.

3. The head-mounted display of claim 1, wherein each of the individual ones of the light conductors arc is hollow.

4. A head-mounted display comprising:
a display assembly including:
a backlight assembly to illuminate a pixelated display panel;
the pixelated display panel positioned in front of the backlight assembly and configured to generate an image having a corresponding first cone of light; and
a lens assembly configured to direct and focus light of the first cone of light from the pixelated display panel to one or both eyes of a user of the head-mounted display, wherein the lens assembly is capable of directing and focusing light at an angle that is at least 50 degrees greater than a maximum angle of the first cone of light, and wherein the maximum angle of the first cone of light and directions of chief rays associated with the first cone of light correspond to a defined eye box range,
wherein the backlight assembly comprises:
a backlight to emit light of a second cone of light; and
an angle-restricting layer between the pixelated display panel and the backlight, wherein the angle-restricting layer comprises an array of light conductors, and wherein each of the individual ones of the light conductors is tapered, and each of the light conductors is configured to:
attenuate light of the second cone of light based, at least in part, on angles that the light of the second cone of light strikes the light conductors; and
pass light of the first cone of light to the pixelated display panel.

5. The head-mounted display of claim 1, wherein each of the individual ones of the light conductors is made of a solid light-transmissive material.

6. The head-mounted display of claim 1, wherein directions of chief rays of light emitted by the backlight assembly substantially match the directions of the chief rays associated with the first cone of light.

7. An optical system comprising:
a backlight assembly to illuminate a pixelated display panel;
the pixelated display panel positioned in front of the backlight assembly and configured to generate an image having a corresponding first cone of light; and
an optical subsystem configured to direct and focus the first cone of light from the pixelated display panel to one or both eyes of a user of the optical system, wherein the optical subsystem is capable of directing and focusing light at an angle that is at least 50 degrees greater than a maximum angle of the first cone of light, and wherein the maximum angle of the first cone of light and directions of chief rays associated with the first cone of light correspond to a defined eye box range,
wherein the backlight assembly comprises:
a backlight to emit light of a second cone of light; and
an angle-restricting layer between the pixelated display panel and the backlight, wherein the angle-restricting layer comprises an array of light conductors that each has a width greater than about 10 microns, and each of the light conductors is configured to:
attenuate light of the second cone of light based, at least in part, on angles that the light of the second cone of light strikes the light conductors; and
pass light of the first cone of light to the pixelated display panel.

8. The optical system of claim 7, wherein each of the individual ones of the light conductors comprises a substantially non-reflective surface that is exposed to the light of the second cone of light.

9. The optical system of claim 7, wherein the backlight assembly include a wedge prism array.

10. An optical system comprising:
a pixelated display panel configured to generate an image having a corresponding first cone of light;
an optical subsystem configured to direct and focus the first cone of light from the pixelated display panel to one or both eyes of a user of the optical system; and
a backlight assembly positioned behind the pixelated display panel and configured to illuminate the pixelated display panel by emitting the first cone of light having a maximum angle that is at least 50 degrees less than an angle of light the optical subsystem is capable of directing and focusing to the one or both eyes of the user, wherein the maximum angle of the first cone of light and directions of chief rays associated with the first cone of light correspond to a defined eye box range,
wherein the backlight assembly comprises:
a backlight to emit light of a second cone of light; and
an angle-restricting layer between the pixelated display panel and the backlight, wherein the angle-restricting layer comprises an array of light conductors that each has a width greater than about 10 microns, and each of the light conductors is configured to:

attenuate light of the second cone of light based, at least in part, on angles that the light of the second cone of light strikes the light conductors; and pass light of the first cone of light to the pixelated display panel.

11. The optical system of claim 10, wherein each of the individual ones of the light conductors comprises a hole that extend through the angle-restricting layer, and wherein an interior surface of each of the holes is substantially non-reflective.

* * * * *

UNITED STATES PATENT AND TRADEMARK OFFICE
CERTIFICATE OF CORRECTION

| | |
|---|---|
| PATENT NO. | : 11,086,129 B2 |
| APPLICATION NO. | : 16/273054 |
| DATED | : August 10, 2021 |
| INVENTOR(S) | : Joshua Mark Hudman |

It is certified that error appears in the above-identified patent and that said Letters Patent is hereby corrected as shown below:

In the Claims

Column 13, Claim 3, Lines 38-39:
"each of the individual ones of the light conductors arc is hollow." should read: --each of the individual ones of the light conductors is hollow.--

Signed and Sealed this
Sixteenth Day of August, 2022

Katherine Kelly Vidal
*Director of the United States Patent and Trademark Office*